UNITED STATES PATENT OFFICE.

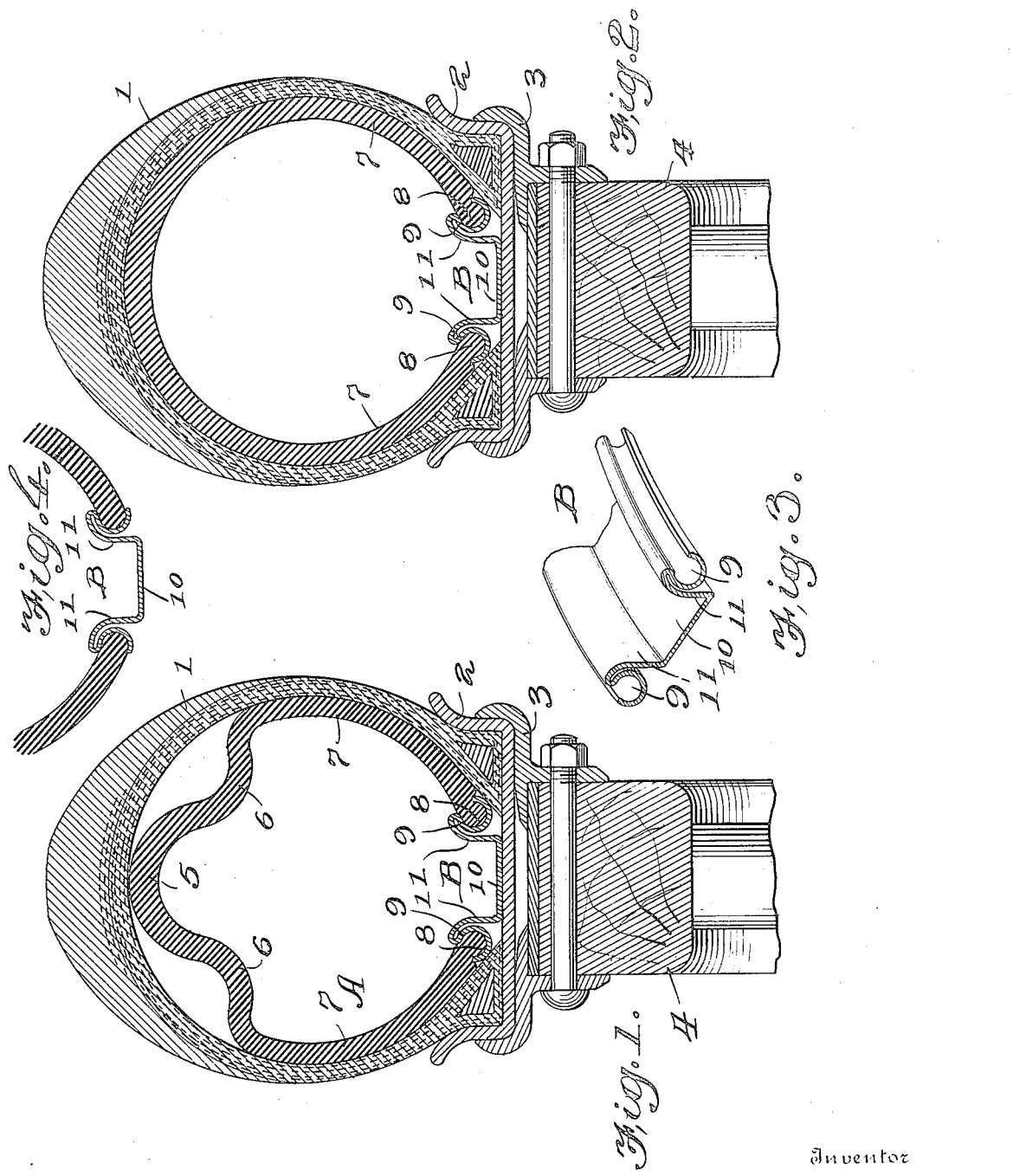

BENJAMIN C. SEATON, OF NASHVILLE, TENNESSEE.

TIRE.

1,213,697. Specification of Letters Patent. Patented Jan. 23, 1917.

Application filed April 15, 1916. Serial No. 91,367.

*To all whom it may concern:*

Be it known that I, BENJAMIN C. SEATON, a citizen of the United States, residing at Nashville, in the county of Davidson and State of Tennessee, have invented new and useful Improvements in Tires, of which the following is a specification.

This invention relates to tires and particularly to the inflatable inner tubes of pneumatic tires, the invention being in the nature of an improvement upon my prior Patent No. 1,077,310 dated November 4, 1913.

The broad object of the present invention is to simplify and improve the construction set forth in my said prior patent, the said construction being productive of materially better results in that there is an entire absence of longitudinal stretching of the tread portion of the inner tube in the interval between the deflated and inflated condition of the tube.

A further object in view is to construct an inner tube member in such formation that the tread portion thereof will be partly under compression when it is associated with the outer casing of the tire and the compression of the walls of the tube member will be considerably increased as the same is inflated and forced into contact with the inner wall of the outer casing thus materially reducing the liability of deflation in case of puncture.

A further object in view is to produce an inner tube member embodying the features above referred to and having in addition thereto such form as to enable a comparatively inexpensive saddle to be employed in conjunction therewith.

With the above and other objects in view, the invention consists in the novel construction, combination and arrangement of parts, as herein described, illustrated and claimed.

In the accompanying drawings:—Figure 1 is a cross section through a tire, illustrating the deflated condition of the inner tube of this invention in its relation to said outer casing, and also showing portions of the wheel and tire carrying rims. Fig. 2 is a similar view showing the inflated position of the inner tube in relation to the outer casing. Fig. 3 is a fragmentary perspective view of the saddle. Fig. 4 is a fragmentary cross section showing a saddle of slightly different formation.

Referring to the drawings 1 designates the outer casing of a pneumatic tire, 2 the tire carrying rim, 3 the wheel rim and 4 the felly of the wheel, said parts being of any usual or preferred construction.

In carrying out the present invention, the inner tube member A which is designated generally at A and which forms the subject matter of this invention is primarily constructed or shaped in such manner that when in a deflated condition, it assumes the shape illustrated in cross section in Fig. 1. Said inner tube member A is composed of resilient and elastic material such as rubber and is of greater thickness than the ordinary inner tube now in common use in order to prevent creasing the same when in its fully inflated condition for a purpose which will hereinafter appear. Primarily the inner tube member A when not in engagement with the saddle designated generally at B is in the form of a sheet provided with the central outwardly curved portion or corrugation 5, and the inwardly curved or offset corrugations 6 which are located at opposite sides of said central corrugated portion and which connect with the curved side wall portions 7 of the tube, it being understood that all of the portions 5, 6 and 7 are formed in one piece.

In the preferred embodiment of this invention, the inner margins of the side walls 7 terminate in transversely rounded extremities 8 to adapt them to fit into the gutter-like annular seats 9 of the saddle B, the main body of which is designated at 10 and formed with outwardly extending flanges 11 which serve to support the annular gutters or seats 9 in spaced relation to the rim 2.

The saddle B entirely encircles the rim 2, being of annular form and fitting snugly around said rim. If desired, the saddle B may be split at one point to enable the same to be associated with and disconnected from the rim 2. In some makes of automobile rims, however, it is not necessary to split the saddle B as in some such rims one of the side flanges is adapted to be disconnected from the body of the rim in which case the saddle B may be slid laterally upon and off the tire carrying rim.

In Figs. 1, 2 and 3, the gutter-like seats 9 are shown as extending throughout more than a semi-circle so as to have a clenching grip on the marginal edges of the inner tube member A. This is not, however, essential as indicated by the modified construction illustrated in Fig. 4 wherein the marginal edges of the inner tube member A may be readily inserted in and removed from the seats of the saddle without any resistance.

The tread portion of the tube member A is, in the preferred embodiment of this invention, of slightly greater external diameter than the internal diameter of the corresponding portion of the inner wall of the outer casing 1. The object of this is to insure a certain degree of pressure between the inner tube member A and the outer casing when said parts are assembled in the manner illustrated in Fig. 1 and before the inner tube is inflated. As the tube is inflated, the inwardly curved or offset portions 6 of the tube member A are forced outwardly against the inner wall of the outer casing 1. During such operation, the entire wall of the inner tube member A is put under compression and air tight joints between the margins of the inner tube and the seats 9 of the saddle B are insured. The saddle B is ordinarily of metal and preferably sheet metal rolled into the shape illustrated in the drawings, and by reason of the compression of the walls of the inner tube member A, tight joints are formed between the marginal edges of the inner tube member A and the metal saddle which prevents any leakage of compressed air from the inner tube.

While the inner tube hereinabove is practically puncture-proof to the extent that it is self-healing by reason of the compression under which the tube is placed throughout its entirety, nevertheless, in case of a possible leak caused by the wearing away of a portion of the wall of the tube, the latter may be easily repaired because after removing the inner tube from the outer casing, the margins of the inner tube may be readily separated from the saddle thus giving access to both the outer and inner surfaces of said inner tube.

In my former patent referred to I made use of an inner tube member A having the central outer or tread portion thereof bowed inwardly. While this gave me to some extent a compressed inner tube member A, the result was found to be partially defective in that the inwardly bowed tread portion of the tube member A had to be stretched circumferentially in order to make contact with the inner surface of the tread portion of the outer casing. In order to obviate this defect I have produced the construction above referred to by placing the central portion of the tread side of the inner tube member A in firm contact with the inner surface of the outer casing and providing inwardly bowed portions at opposite sides thereof. Therefore, when the inner tube is inflated, the said inwardly bowed portions will equally compress the side wall portions of the tire and hence the tube member A as a whole will be under compression throughout its whole extent. Furthermore by reason of the construction described, the expensive molds now employed in the manufacture of inner tubes are unnecessary, materially reducing the cost of manufacture as well as the cost of maintenance.

I claim:—

1. An inner tube for pneumatic tires comprising a sheet-like member of resilient material having a central longitudinal outwardly bowed portion, and other inwardly bowed portions at opposite sides of said outwardly bowed portion, and a saddle adapted to encircle the tire carrying rim, said saddle being formed with annular seats for the marginal edges of said inner tube member.

2. An inner tube member for pneumatic tires comprising a sheet-like body of resilient material having a central longitudinal outwardly bowed portion, and other inwardly bowed portions at opposite sides of said outwardly bowed portion, and a saddle adapted to encircle the tire carrying rim, said saddle being formed with annular seats for the marginal edges of said inner tube member, the said inwardly bowed portions serving when the tube is in a fully expanded condition to press the marginal edges of the body of said tube member into air-tight engagement with said annular seats.

In testimony whereof I affix my signature.

BENJAMIN C. SEATON.